Nov. 22, 1960  J. S. DONALDSON  2,960,885
DRIVER'S CANE FOR SUPPLEMENTAL ACCELERATOR OPERATION
Filed Dec. 10, 1957  2 Sheets-Sheet 1
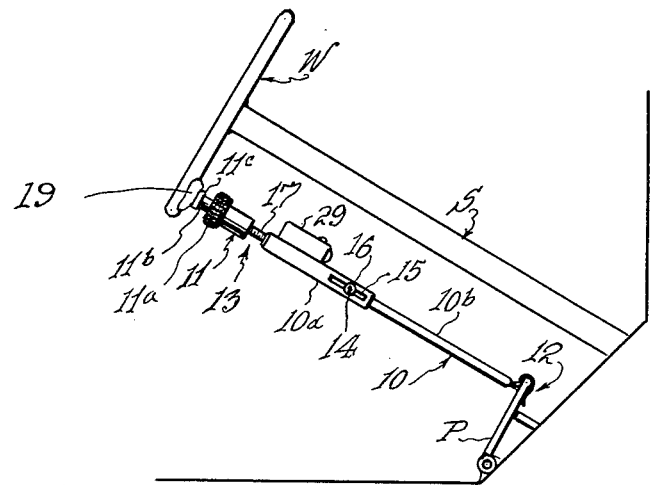
Fig. 1
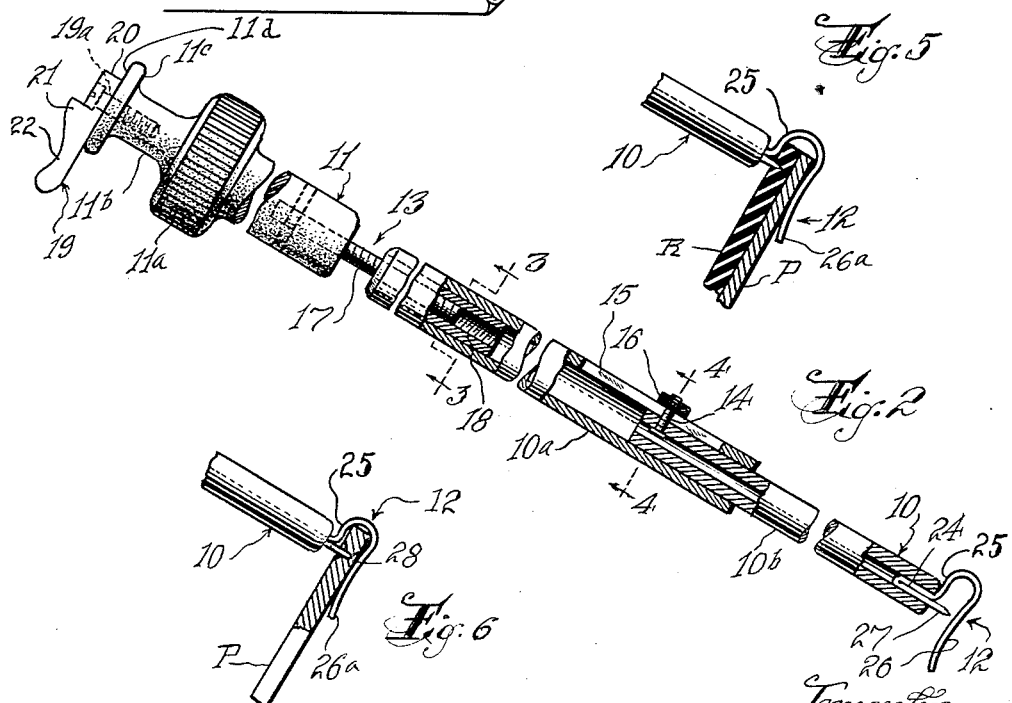
Fig. 5
Fig. 2
Fig. 6
Inventor:
John Shearman Donaldson
By Dudley B. Howard
Attorney

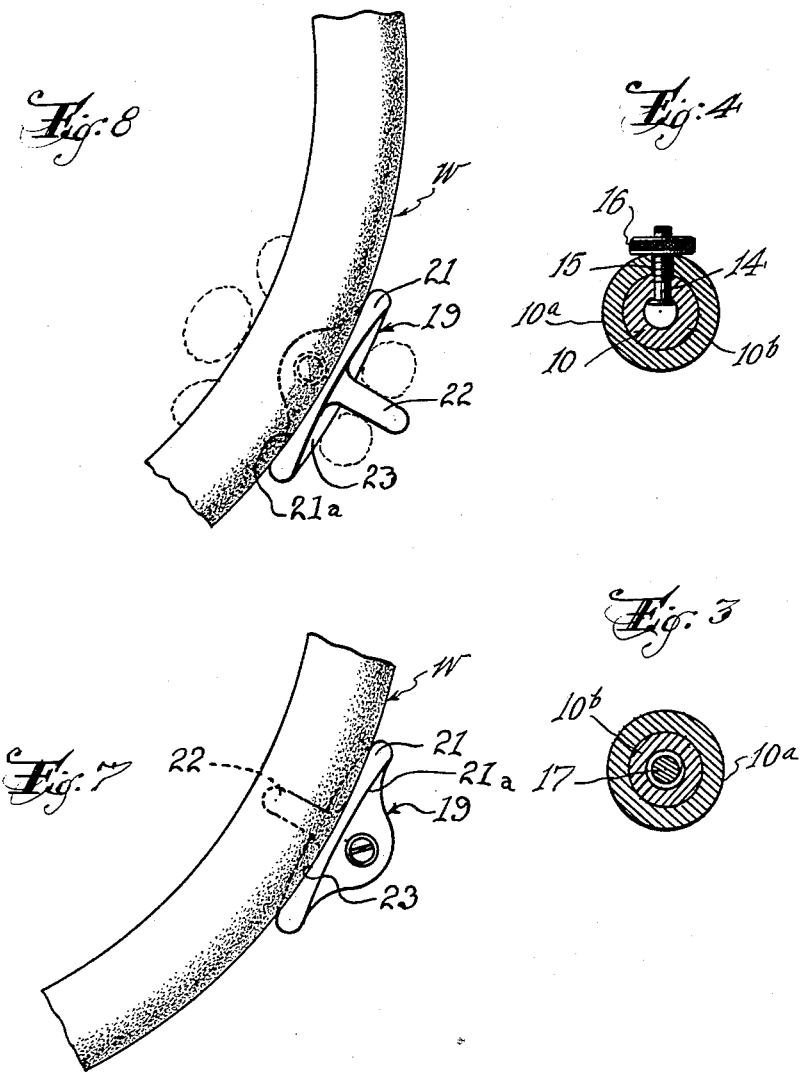

2,960,885
Patented Nov. 22, 1960

2,960,885

DRIVER'S CANE FOR SUPPLEMENTAL ACCELERATOR OPERATION

John Shearman Donaldson, 48 Hedges Ave., Chatham, N.J.

Filed Dec. 10, 1957, Ser. No. 701,785

7 Claims. (Cl. 74—482)

The invention relates in general to automobile accessories and has particular reference to means used by the driver of an automobile for operation of the speed acceleration control thereof.

In automobiles, the speed acceleration control includes the foot-operated accelerator proper, or foot pedal, which customarily is located on the floor of the car near the base of the steering column. Foot operation of the accelerator pedal may be preferred when driving short distances involving frequent changes in speed and a lot of starting and stopping, but long-continued foot operation while driving for great distances at uniformly high speeds on the modern turnpikes and thruways can become extremely tiresome.

I am aware of a few prior art devices that permit the driver of an automobile to use his hands instead of his feet in operating the accelerator pedal under various conditions, such as to avoid leg fatique in long-distance high-speed trips, when starting the engine on an inclined street or driveway, or when the battery is being charged. However, these prior art devices are permanently installed in the automobiles which they serve and are not fully satisfactory and safe under all driving situations. For example, they cannot be put out of commission quickly enough to permit instantaneous resumption of foot operation in an emergency, as when traffic ahead suddenly slows down or when speed must be retarded abruptly for a sharp curve in the road.

It therefore is the primary object of my present invention to provide long-distance drivers with an improved hand-operated device to use on appropriate occasions in substitution for foot-operation of the accelerator that has proven in practical use to be entirely safe and satisfactory under all situations ordinarily encountered.

With safety in operation as the underlying fatcor, it is a further object to provide a manual control device that is in the form of a cane-like thrust body which is "floating" in the manner of its assembly with the conventional foot accelerator and adapted to be put into commission and removed therefrom without the slightest interference with relaxation or resumption, respectively, of normal foot operation. To be explicit, the floating cane is bodily fitted into place as a sort of wedge between the accelerator pedal and the steering wheel for temporary use as long as desired and may be pushed aside into detached, inoperative condition in an instant of time when foot operation has to be resumed either due to emergency conditions or when changing from long-continued high-speed driving to normal slow-speed conditions.

Another object is to provide a floating driver's cane of adjustable length that is interposed in assembled condition between the accelerator foot pedal and the rim of the steering wheel, or the driver's hand while grasping the wheel, so that the pressure upon the pedal may be varied with precision unitl set at the desired speed for existing traffic conditions.

An object of the invention also is to provide a device of the class described which is extremely simple in construction and mode of operation and which may be produced at very low cost.

Still further objects, advantages and features of the invention will become apparent as the following specific description is read in connection with the accompanying drawings, in which:

Fig. 1 is a side elevational view, partially in section and broken away, of the driver's compartment of an automobile, showing the present invention temporarily installed therein in operational condition for manual control of the regular accelerator foot pedal.

Fig. 2 is a side elevation of the device alone on an enlarged scale and partly in section; Fig. 3 is a cross-section on line 3—3 of Fig. 2; and Fig. 4 is a similar view on line 4—4 of Fig. 2.

Fig. 5 is a fragmentary vertical section of an accelerator foot pedal having a rubber foot pad and showing the tip end of the thrust body, which is broken away, operatively engaged therewith; and Fig. 6 is a similar view, showing a modified form of accelerator foot pedal.

Fig. 7 is an end elevation of the device and the steering wheel, the latter being broken away, showing the device used in the manner depicted in Fig. 1 without being hand-grasped directly; and Fig. 8 is a similar view, showing both the steering wheel and the handle of the cane included in the grasp of the driver's right hand.

Referring now in detail to the drawings, wherein like reference characters designate corresponding parts in the several views, it will be observed that the improved device for manual operation of the vehicle's accelerator foot pedal is like a walking cane in general appearance and comprises four principal component parts, viz: thrust body 10, handle 11 at one end of said rod, pedal-engaging means 12 at its opposite end, and means 13 by which the distance between handle 11 and pedal-engaging means 12 may be adjusted manually during operation of the device.

Thrust body 10 should be substantially long enough to reach from the accelerator foot pedal P of the automobile in which it is to be installed to the steering wheel W which surmounts steering column S thereof. The "driver's cane," as the device may be called, is "floating" in nature as distinguished from a device of this class that is permanently affixed to the body or steering column of a car as in the instance of the cited prior art devices. My improved device, on the contrary, is capable of quick temporary installation and detachment. Because safety in use is of essential importance with such a device, my driver's cane is capable of being separated from engagement with the steering wheel and pushed aside bodily in an instant of time into a position resting upon the driver's seat wherein it cannot obstruct resumption of foot operation of the accelerator foot pedal. To aid in such quick action, thrust body 10 should be light in weight, so may be made of wood. bamboo, or of light metal tubing such as aluminum. The drawings of the present application show the thrust body as being made of metal tubing, by way of example.

Because there may be some variation in automobiles of different makes in the distance from the accelerator foot pedal to the steering wheel, I have made thrust body 10 in two telescopically united, axially adjustable sections, viz: a butt section 10a and a tip section 10b. Sections 10a and 10b may be secured in any set generally adjusted relation by suitable means, such as that shown in Figs. 2 and 4. In this instance, a radial screwthreaded stud 14 affixed to tip section 10b of thrust body 10 projects outwardly through a longitudinal slot 15 in butt section 10a and has a preferably knurled set-nut 16 applied to its protruding portion for locking contact with the peripheral face of said butt section.

Handle 11 of the cane may conveniently be made of wood and preferably has an enlarged, externally fluted finger-grip portion 11a intermediate of its inner and outer ends. The inner end of handle 11 is rendered longitudinally adjustable in relation to butt section 10a of thrust body 10 by means 13 previously mentioned. This operational adjustment means 13 may take any suitable form, but I presently prefer the structure shown in Figs. 2 and 3, wherein an externally screwthreaded stem 17, that is rigid with the inner end portion of handle 11 and extends axially therefrom, is adjustably engaged with an internally screwthreaded sleeve 18 which is fixedly secured in suitable manner in the bore of butt section 10a of thrust body 10 at the end thereof adjacent to handle 11. By rotating handle 11 while the tip of thrust body 10 is non-rotatably engaged with accelerator foot pedal P, the effective length of the cane as a whole may be varied with micrometric precision at will. Finger-grip portion 11a of handle 11 is employed in this adjustment in a manner to be described in detail later herein.

It may be mentioned at this juncture that my driver's cane is intended to be used in two different ways as presently contemplated. One way is to engage handle 11 immovably with the rim of steering wheel W for straightaway driving in the manner disclosed in Figs. 1 and 7 and then regulate the automobile's speed by manual rotation of said handle. The other mode of operation is to include handle 11 and the rim of steering wheel W in the grasp of the driver's right hand in the manner shown in Fig. 8, whereby the right hand's grip on the wheel may be released slightly to permit wheel operation by the left hand when driving on curves. Both modes of operation will be described more fully later, but have been mentioned briefly at this time for a better understanding of the further structural details of handle 11 which follow immediately hereinafter.

Outwardly adjacent to fluted finger-grip portion 11a of handle 11 there is a finger-intervening portion 11b of reduced external diameter designed to fit comfortably between the fingers of the driver's right hand when holding the handle and wheel rim for driving on curves. Outwardly with respect to this reduced portion 11b of handle 11, a terminal annular flange 11c is provided to afford a large-area bearing face 11d for hand-grasped swivel-head 19, which is rotatably connected to handle 11 by axial pivot means, such as screw 19a.

Swivel-head 19 includes a substantially flat base plate 20 that bears against flange 11c of handle 11. At one side of base plate 20, an upstanding integral flange 21 is provided for contact with the outer side face of the rim of steering wheel W. This flange 21 is arcuate in general shape concentric with the longitudinal axis of thrust body 10 and having substantially the same radius of curvature as the convex outer side face of a steering wheel rim and is adapted to have its concave face 21a in bearing contact with the wheel rim as shown in Fig. 8 when driving on curves. An integral rim abutment arm 22 is formed on base plate 20 to project radially away from the convex side of flange 21. As shown in Fig. 7, to arrange my driver's cane for driving on straightaway sections of a turnpike or thruway, base plate 20 is turned through an angle of 180 degrees until rim abutment arm 22 underlies the rim of steering wheel W. The tension of the accelerator pedal spring holds abutment arm 22 of the cane against the steering wheel. In order to prevent accidental reverse rotation of base plate 20 and consequent disengagement of rim abutment arm 22 with the wheel rim, the generally convex side of flange 21 has a concave guide indentation 23 corresponding in curvature to the convex outer peripheral face of the wheel rim for even contact therewith.

At the tip end of my driver's cane, the means 12 for engagement with accelerator foot pedal P preferably is in the form of a spring clip comprising an attaching shank 24 to be seated in the bore of tip section 10b of thrust body 10, a pair of jaws 25 and 26 to embrace the upper edge of accelerator foot pedal P, and a retaining pin 27 that projects axially from the base portion of inner jaw 25 into the space between said jaw and outer jaw 26 for piercing engagement with the rubber foot pad R on the upper face of pedal P in the manner shown in Figs. 1 and 5. Outer jaw 26 is bent outwardly to form a lip 26a which facilitates engagement and disengagement with the pedal.

Fig. 6 shows a modified form of accelerator pedal which is unpadded and for this reason is provided with an aperture 28 near its upper edge for reception of retaining pin 27. In this instance, the jaws 25 and 26 of engaging means 12 are separated by a less distance than in the Fig. 5 disclosure.

As shown in Fig. 1, a flashlight device 29 may be attached to thrust body 10 in order to be used in illuminating pedal P and engaging means 12.

Operational use of my driver's cane will now be described.

It will be assumed at the outset that the respective butt and tip sections 10a and 10b of thrust body 10 have been relatively adjusted longitudinally to accommodate the overall length of the cane to the pedal-to-steering wheel dimension of the automobile in which the device is to be used. When it becomes time to install the cane in the automobile, the driver engages spring clip 12 at the tip end of thrust body 10 with the upper edge of the accelerator foot pedal as shown in Figs. 1, 5 and 6. If it is dark at the time, flashlight 29 may be turned on to illuminate clip 12 and the accelerator pedal.

With further reference to the effective overall length of the cane, it should be such that abutment arm 22 on swivel-head 19 will engage the rear face of the rim of the steering wheel at a convenient location in the right lower, or second, quadrant, as shown in Figs. 1 and 7.

Assuming that the driver is going to pass through the congested streets of a town and along a winding road before entering high-speed traffic on a turnpike or thruway for his long-distance journey, he may not need to use the cane at all until he gets out of town. Consequently, he probably will lay the cane's handle 11 on the front seat alongside the driver's position. Now, when he reaches the winding road it may be desired to commence use of the cane. Because of the frequent, short-radius curves, he probably will employ the cane in the hand-held condition shown in Fig. 8. In this condition swivel-head 19 is rotated until abutment arm 22 projects away from the wheel rim and guide indentation 23 bears evenly against the outer peripheral face rim. With swivel-head 19 and the wheel rim lightly included in the grasp of his right hand, the two middle fingers should straddle abutment arm 22 and the reduced-size portion 11b of handle 11. Minor adjustments of the cane length to increase or decrease thrust pressure on the accelerator pedal may be accomplished by extending the fingers until they engage fluted enlargement 11a of handle 11 and then rotating the handle clockwise or counter-clockwise as required. More pronounced regulation of thrust pressure on the pedal may be effected by rotating the palm of the hand around the steering wheel rim in the necessary direction. This latter operation becomes necessary when negotiaing curves. Because the wheel rim is lightly embraced by the driver's right hand, the wheel may be rotated freely by his left hand without disturbing the speed-regulating position of the cane handle.

The supreme advantage of my cane is realized however when the driver turns onto the main turnpike or thruway and settles down to the long high-speed grind of his journey. In this instance, he likely is using his right foot on the accelerator pedal while moving onto the main thorofare. Just as soon as he has set the speed just right for the existing traffic conditions, the driver swings the cane's handle back alongside the steering wheel and rotates swivel-head 19 until abutment arm 22 is close to the underneath face of the wheel rim in the manner shown in Fig. 7. Then, he rotates handle 11 until abutment arm 22 presses aganist the wheel rim in a position to maintain the required thrust pressure on the accelerator pedal. A steady rate of speed is maintained by the cane while thus used as a wedge between wheel and pedal in this hand-off condition. Minor speed adjustments may be made by rotary manipulation of handle 11, again using his right hand.

The great safety feature of the invention arises when a traffic emergency suddenly happens. Instantaneous return to foot operation of the accelerator pedal is imperative. With the permanently installed devices of the prior art, safe resumption of foot operation would be impossible. With my temporary cane, however, all that is required is to slap the cane handle sideways and let it drop on the driver's seat as the right foot is applied to the brake pedal. Without this safety aspect, a supplemental manual control device for the accelerator pedal would not be accepted by automobile owners.

In some automobiles there are structural features that would interfere with installation of a straight cane, so it is within the scope of the invention to curve or otherwise bend the thrust body in a manner to bypass structural interference.

It will be observed that my cane comprises three readily separable parts, i.e. the handle and the two sections of the thrust body. Due to this construction, it is practicable to unjoint the cane and store its three parts side by side in a handbag or other container when not in operational use. By dividing the thrust body into more than two sections that telescope into the same length as the handle, a collapsed cane of minimum length may be formed.

It will be understood that it is intended to cover all changes and modifications of the example of the invention herein chosen for the purpose of illustration which do not constitute departures from the spirit of the invention and scope of the appended claims.

I claim:

1. A quickly detachable automobile driver's cane adapted to be used temporarily in an automobile having a spring-supported accelerator foot pedal and a steering wheel having a circular rim with a convex outer peripheral side face for manual relief of foot operation of the accelerator foot pedal during long-continued driving, said cane comprising: a thrust body having butt and tip ends; means provided at the tip of said thrust body to temporarily engage the accelerator foot pedal; and handle means located at the butt of said thrust body in axial screwthreaded connection therewith and including a hand-graspable head adapted to be included in the driver's hand-grasp with the rim of the steering wheel, said head including an outstanding integral flange of arcuate shape connected with the thrust body of the cane at the latter's axis and having its concave face substantially corresponding in radius to the convex outer peripheral side face of the steering wheel rim for bearing contact therewith.

2. The invention defined in claim 1, wherein the hand-graspable head of the handle has an abutment arm projecting radially outward from the convex side of the outstanding flange thereof and adapted to be engaged beneath the wheel rim.

3. The invention defined in claim 1, wherein the handle has an enlarged finger-manipulating portion spaced axially outward from the hand-graspable head for micrometric precision adjustment of the effective length of the cane to control the accelerator pedal speed setting.

4. The invention defined in claim 1, wherein the hand-graspable head is swiveled on the outer end of the handle for axial rotation with respect thereto, and wherein an abutment arm projects radially outward from the convex side of the upstanding arcuate flange of the swiveled hand-graspable head for engagement beneath the steering wheel rim when said head is rotated into reversed position with its concave bearing face outwardly presented.

5. The invention defined in claim 1, wherein the outstanding flange has an outwardly concave guide indentation in its convex side face for wheel rim bearing contact to prevent accidental rotation of the swivel-head when the abutment arm is inturned beneath the wheel rim.

6. A quickly detachable automobile driver's cane adapted to be used temporarily in an automobile having a spring-supported accelerator foot pedal and a steering wheel having a circular rim with a convex outer peripheral side face, the cane providing for manual relief of foot operation of the accelerator pedal during long-continued highway driving comprising: a thrust body having butt and tip sections which are telescopically united for relative sliding rough adjustments to vary the over-all length of said body; means by which said butt and tip sections of the thrust body may be secured in adjusted positions; means provided at the outer end of said tip section of the thrust body to temporarily engage the accelerator foot pedal; handle means located at the butt end of the butt section of the thrust body with axial screwthreaded connection to said butt section for micrometric precision adjustments; and a head axially swiveled on said handle and adapted to be included in the driver's hand-grasp with the rim of the steering wheel; said head including an outstanding integral flange of arcuate shape concentric with the axis of the thrust body of the cane and having its concave face substantially corresponding in radius to the convex outer peripheral side face of a steering wheel rim for bearing contact therewith.

7. The invention defined in claim 6, wherein an abutment arm projects radially outward from the convex side of the outstanding flange of the hand-graspable head to be engaged beneath the steering wheel rim when said head is rotated to render the concave bearing face outwardly presented.

References Cited in the file of this patent

UNITED STATES PATENTS

| | | |
|---|---|---|
| 1,455,617 | Jackson | May 15, 1923 |
| 1,681,380 | Taman | Aug. 21, 1928 |
| 1,707,113 | Christ | Mar. 26, 1929 |
| 1,721,227 | Manley | July 16, 1929 |
| 2,138,911 | Evans et al. | Dec. 6, 1938 |
| 2,666,510 | Pokorny | Jan. 19, 1954 |
| 2,671,355 | Hawkins | Mar. 9, 1954 |
| 2,694,318 | Smith et al. | Nov. 16, 1954 |
| 2,755,684 | Russell | July 24, 1956 |
| 2,866,356 | Elam | Dec. 30, 1958 |